(12) United States Patent
Kruglick

(10) Patent No.: US 9,736,043 B2
(45) Date of Patent: Aug. 15, 2017

(54) OPTIMIZATION OF RESOURCE UTILIZATION IN A COLLECTION OF DEVICES

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 65 days.

(21) Appl. No.: 14/593,326

(22) Filed: Jan. 9, 2015

(65) Prior Publication Data

US 2015/0120923 A1 Apr. 30, 2015

Related U.S. Application Data

(63) Continuation of application No. 13/515,052, filed as application No. PCT/US2011/067120 on Dec. 23, 2011, now Pat. No. 8,959,228.

(51) Int. Cl.
G06F 15/16 (2006.01)
H04L 12/26 (2006.01)
(Continued)

(52) U.S. Cl.
CPC .......... H04L 43/08 (2013.01); G06F 9/5077 (2013.01); H04L 47/125 (2013.01); H04L 47/76 (2013.01);
(Continued)

(58) Field of Classification Search
CPC ............... G06F 9/4558; G06F 9/4856; G06F 2009/4557; G06F 9/45533; G06F 9/5077;
(Continued)

(56) References Cited

U.S. PATENT DOCUMENTS 7,248,564 B1 7/2007 Grosdidier et al.
8,959,228 B2 * 2/2015 Kruglick .............. G06F 9/5077
709/226

(Continued)

FOREIGN PATENT DOCUMENTS

CN 101739287 A 6/2010

OTHER PUBLICATIONS

Al-Fares, M., et al., "A Scalable, Commodity Data Center Network Architecture" Proceedings of the ACM SIGCOMM 2008 conference on Data communication, pp. 63-74 (Aug. 17, 2008).
Chen, Y., and Chen, F., "Techniques of Virtual Machine", Enterprise Guide, Issue 7, p. 282, http://www.cnki.net (Apr. 2011).
Benson. T., et al., "Network Traffic Characteristics of Data Centers in the Wild," IMC '10 Proceedings of the 10th annual conference on Internet measurement. pp. 267-280 (Nov. 1-3, 2010).
(Continued)

Primary Examiner — Jungwon Chang
(74) Attorney, Agent, or Firm — Brundidge & Stanger, P.C.

(57) ABSTRACT

Technologies are described herein for optimizing resource utilization in a collection of devices having hierarchical network layers. Some example technologies may identify packets exchanged between processes executed on collections of server computers. The hierarchical network layers may couple the collections of server computers. The technologies may determine virtual machine groups based on the identified packets. Each of the virtual machine groups may identify one or more virtual machines configured on the collections of server computers to execute one or more processes. The virtual machine groups may be configured to increase data traffic in a lower layer in the hierarchical network layers and to decrease the data traffic in a higher layer in the hierarchical network layers. The technologies may relocate the virtual machines between the collections of server computers according to the virtual machine groups.

19 Claims, 6 Drawing Sheets

(51) Int. Cl.
*G06F 9/50* (2006.01)
*H04L 12/931* (2013.01)
*H04L 12/803* (2013.01)
*H04L 12/917* (2013.01)
*H04L 29/08* (2006.01)
*G06F 9/455* (2006.01)
*G06F 9/48* (2006.01)

(52) U.S. Cl.
CPC .......... *H04L 49/70* (2013.01); *G06F 9/45533* (2013.01); *G06F 9/4856* (2013.01); *G06F 2009/4557* (2013.01); *H04L 67/34* (2013.01)

(58) Field of Classification Search
CPC ....... H04L 43/08; H04L 47/125; H04L 47/76; H04L 67/34; H04L 49/70
USPC ......... 709/226, 246, 224; 717/138; 370/401, 370/237, 395.1; 718/1
See application file for complete search history.

(56) References Cited

U.S. PATENT DOCUMENTS

| | | | |
|---|---|---|---|
| 2002/0097747 A1 | 7/2002 | Kirkby et al. | |
| 2007/0180436 A1* | 8/2007 | Travostino | G06F 9/4856 717/138 |
| 2008/0165685 A1 | 7/2008 | Weiss et al. | |
| 2010/0241807 A1 | 9/2010 | Wu et al. | |
| 2010/0306445 A1 | 12/2010 | Dake | |
| 2011/0075674 A1* | 3/2011 | Li | H04L 12/5695 370/401 |
| 2011/0099551 A1 | 4/2011 | Fahrig et al. | |
| 2011/0103389 A1* | 5/2011 | Kidambi | H04L 45/586 370/395.1 |
| 2011/0173329 A1 | 7/2011 | Zhang et al. | |
| 2011/0225277 A1 | 9/2011 | Freimuth et al. | |
| 2011/0271007 A1 | 11/2011 | Wang et al. | |
| 2012/0131225 A1* | 5/2012 | Chiueh | H04L 12/4633 709/246 |
| 2013/0100816 A1* | 4/2013 | Bergamasco | H04L 43/0864 370/237 |
| 2013/0152076 A1* | 6/2013 | Patel | G06F 9/45558 718/1 |

OTHER PUBLICATIONS

Cohen, J., "Graph Twiddling in a MapReduce World," Computing in Science and Engineering, vol. 11, Issue 4, pp. 29-41 (Jul. 2009).

Ersoz, D. et al., "Characterizing Network Traffic in a Cluster-based, Multi-tier Data Center," 27th International Conference on Distributed Computing Systems, pp. 10 (Jun. 25-27, 2007).

Greenberg, A., et al., "VL2:A Scalable and Flexible Data Center Network," GCOMM '09 Proceedings of the ACM SIGCOMM 2009 conference on Data communication, pp. 51-62 (Aug. 2009).

Greenberg, A., et al., "VL2: a Scalable and Flexible Data Center Network," Communications of the ACM, vol. 54, No. 3, pp. 95-104 (Mar. 2011).

International Search Report & Written Opinion for PCT Application No. PCT/US11/67120 mailed on Mar. 12, 2012.

Kandula, S., et al., "The Nature of Datacenter Traffic: Measurements & Analysis," IMC '09 Proceedings of the 9th ACM SIGCOMM conference on Internet measurement conference, pp. 202-208 (Nov. 2009).

Meng, X. et al., "Improving the Scalability of Data Center Networks with Traffic-aware Virtual Machine Placement," Proceedings IEEE INFOCOM, pp. 1-9 (Mar. 14-19, 2010).

Rao, D., and Yarowsky, D., "Ranking and semi-supervised classification on large scale graphs using map-reduce," in Proceedings of the 2009 Workshop on Graph-based Methods for Natural Language Processing (Association for Computational Linguistics), pp. 58-65 (2009).

Sonnek, J. et al., "Starling: Minimizing Communication Overhead in Virtualized Computing Platforms Using Decentralized Affinity-Aware migration," 39th International Conference on Parallel Processing (ICPP). pp. 228-237.

Valentine-Devries, J., "More Predictions on the Huge Growth of 'Cloud Computing'," accessed at https://web.archive.org/web/20111204092457/http://blogs.wsj.com/digits/2011/04/21/more-predictions-on-the-huge-growth-of-cloud-computing, posted on Apr. 21, 2011, pp. 3.

White, R. et al., "Deploying IS-IS on a Three-Layer Hierarchy," Optimal Routing Design, Chapter 5. Cisco Press, pp. 1-9 (2005).

Zhang-Shen. R., and McKeown, N., "Designing a Predictable Internet Backbone Network," IWQoS'05 Proceedings of the 13th international conference on Quality of Service, pp. 178-192 (2005).

\* cited by examiner

Fig. 3

| | VIRTUAL MACHINE A 304A | VIRTUAL MACHINE B 304B | VIRTUAL MACHINE C 304C | VIRTUAL MACHINE D 304D | VIRTUAL MACHINE E 304E |
|---|---|---|---|---|---|
| VIRTUAL MACHINE A 302A | | 306A | 306F | 306K | 306P |
| VIRTUAL MACHINE B 302B | 306B | 306G | 306L | 306Q *123* | 306U |
| VIRTUAL MACHINE C 302C | 306C | 306H | 306M | 306R | 306V |
| VIRTUAL MACHINE D 302D | 306D | 306I *123* | 306N | 306S | 306W |
| VIRTUAL MACHINE E 302E | 306E | 306J | 306O | 306T | 306X / 306Y |

300

OPTIMIZATION OF RESOURCE UTILIZATION IN A COLLECTION OF DEVICES

CROSS-REFERENCE TO RELATED APPLICATIONS

This application is a continuation filed under 35 U.S.C. §120 of U.S. patent application Ser. No. 13/515,052, filed on Jun. 11, 2012, now U.S. Pat. No. 8,959,228, and titled "Optimization of Resource Utilization In a Collection of Devices," which is the national stage application filed under U.S.C. §371 of PCT Application No. PCT/US11/67120, filed Dec. 23, 2011, titled "Optimization of Resource Utilization In a Collection of Devices," which are both expressly incorporated herein by reference in their entireties.

BACKGROUND

Unless otherwise indicated herein, the materials described in this section are not prior art to the claims in this application and are not admitted to be prior art by inclusion in this section.

Commercial data centers may be implemented as a Clos-connected network. A typical Clos-connected network may be implemented as a multi-layer network architecture, such as a two-layer network architecture or a three-layer network architecture. For example, a three-layer network architecture may be arranged as an upside-down tree, where a core layer forms a root of the tree, an aggregation layer forms a middle of the tree, and an edge layer forms leaves of the tree. The core layer, the aggregation layer, and the edge layer may include multiple network elements, such as an Ethernet switch.

In a Clos-connected network, traffic between neighboring network elements within the aggregation layer or within the edge layer may be routed through the network elements in the core layer. As result, the core layer may experience significant congestion, while lower layers, such as the aggregation layer or the edge layer, may have available bandwidth.

SUMMARY

The present disclosure generally describes techniques for optimizing resource utilization in a collection of devices having hierarchical network layers. Some example methods may identify packets exchanged between processes executed on collections of server computers. The hierarchical network layers may couple the collections of server computers. Example methods may determine virtual machine groups based on the identified packets. Each of the virtual machine groups may identify one or more virtual machines configured on the collections of server computers to execute one or more processes. The virtual machine groups may be configured to increase data traffic in a lower layer in the hierarchical network layers and to decrease the data traffic in a higher layer in the hierarchical network layers. Example methods may relocate the virtual machines between the collections of server computers according to the virtual machine groups.

The present disclosure generally further describes some computer-readable storage media adapted to optimize resource utilization in a collection of devices having a plurality of hierarchical network layers. The computer-readable storage media may include computer-executable instructions stored thereon which, when executed by a computer, cause the computer to perform one or more operations. Some example computer-executable instructions may cause the computer to identify packets exchanged between processes executed on collections of server computers. The hierarchical network layers may couple the collections of server computers. Example computer-executable instructions may cause the computer to determine virtual machine groups based on the identified packets. Each of the virtual machine groups may identify one or more virtual machines configured on the collections of server computers to execute one or more processes. The virtual machine groups may be configured to increase data traffic in a lower layer in the hierarchical network layers and to decrease the data traffic in a higher layer in the hierarchical network layers. Example computer-executable instructions may cause the computer to relocate the virtual machines between the collections of server computers according to the virtual machine groups.

The present disclosure generally also describes some computer systems adapted to optimize resource utilization in a collection of devices having a plurality of hierarchical network layers. Some example computer systems may include a processor and a memory coupled to the processor. Example computer systems may also include a program module which is executable by the processor from the memory and which, when executed by the processor, causes the computer system to perform one or more operations. Some example program modules may cause the computer system to identify packets exchanged between processes executed on collections of server computers. The hierarchical network layers may couple the collections of server computers. Each of the packets may include a source identifier, a destination identifier, and a data size. Example program modules may cause the computer system to determine virtual machine groups based on the source identifier, the destination identifier, and the data size. Each of the virtual machine groups may identify one or more virtual machines configured on the collections of server computers to execute one or more of the processes. The virtual machine groups may be configured to increase data traffic in a lower layer in the hierarchical network layers and to decrease the data traffic in a higher layer in the hierarchical network layers. Example program modules may cause the computer system to relocate the virtual machines between the collections of server computers according to the virtual machine groups.

The foregoing Summary is illustrative only and is not intended to be in any way limiting. In addition to the illustrative aspects, embodiments, and features described above, further aspects, embodiments, and features will become apparent by reference to the Figures and the following Detailed Description.

DESCRIPTION OF THE FIGURES

The foregoing and other features of this disclosure will become more fully apparent from the following Detailed Description, accompanying Figures, and appended claims. Understanding that these Figures depict only several embodiments in accordance with the disclosure and are, therefore, not to be considered limiting of its scope, the disclosure will be described with additional specificity and detail with reference to the accompanying Figures, in which:

FIG. 3 is a diagram illustrating an example implementation of a portion of matrix;

DETAILED DESCRIPTION

In the present Detailed Description, reference is made to the accompanying Figures, which form a part hereof. In the Figures, similar symbols typically identify similar components, unless context dictates otherwise. The illustrative embodiments described in the Detailed Description and Figures are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to technologies adapted to decrease traffic in a core layer of a network, and also to increase traffic in lower layers, such as an aggregation layer or an edge layer, of the network. The technologies may be adapted to identify data packets transmitted between server computers within the network architecture, which may represent a data center or some other collection of devices. The data packets may be transmitted and received by processes executed by virtual machines on the server computers. The technologies may be adapted to generate a matrix based on the identified data packets. The matrix may specify an amount of traffic transmitted between pairs of virtual machines in the network.

The technologies may be adapted to determine virtual machine groups based on the matrix. The virtual machine groups may contain groups of virtual machines arranged such that traffic in the lower layers of the network is decreased, while traffic in the core layer of the network stays the same or is increased. The technologies may be adapted to relocate virtual machines between the server computers in accordance with the determined virtual machine groups.

Figure 1:
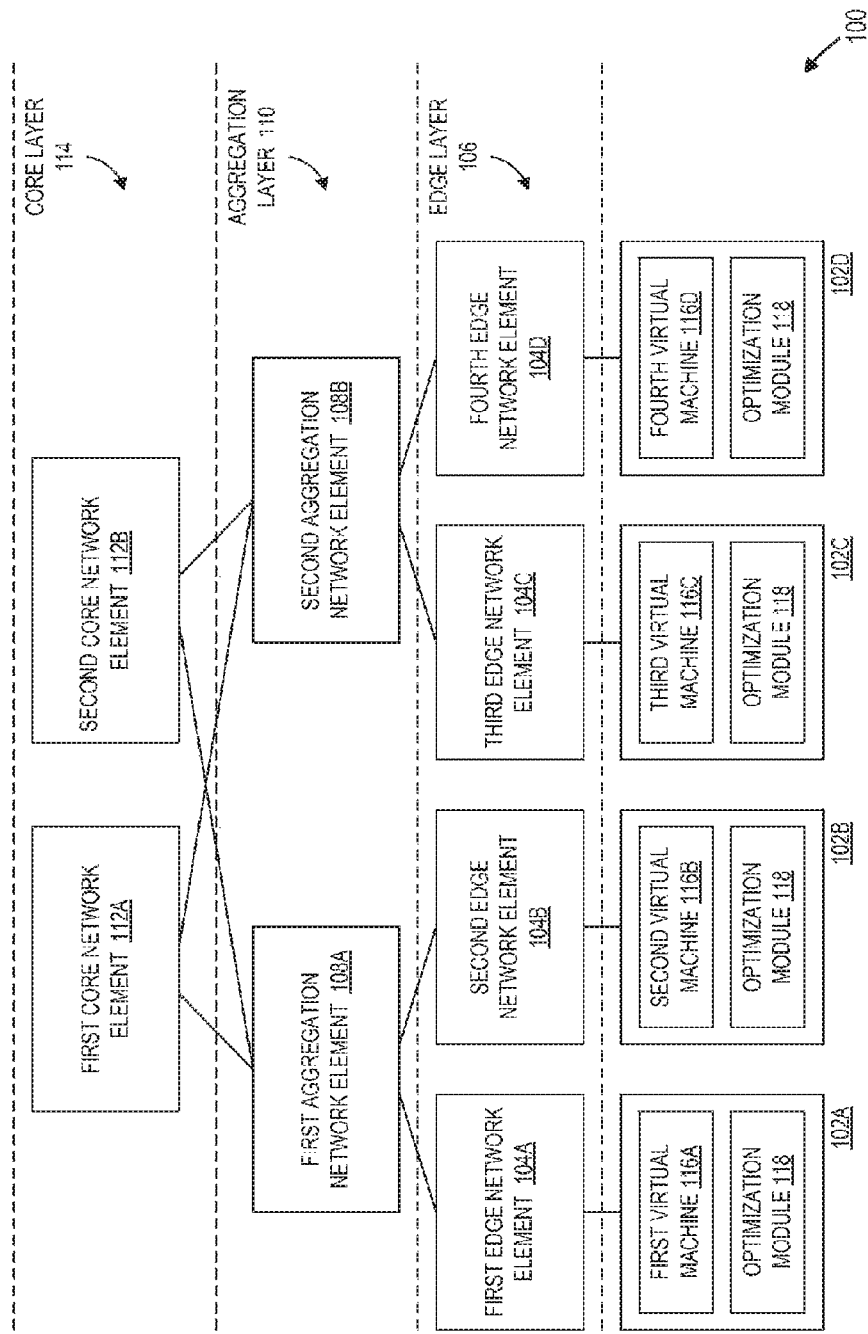
FIG. 1 is a functional block diagram illustrating an example Clos-connected network architecture adapted to optimize resource utilization in a collection of devices.

FIG. 1 is a functional block diagram illustrating an example Clos-connected network architecture 100 adapted to optimize resource utilization in a collection of devices, arranged in accordance with at least some embodiments presented herein. The network architecture 100 may be a configuration of a data center, according to some embodiments. The network architecture 100 may include a first collection of server computers 102A, a second collection of server computers 102B, a third collection of server computers 102C, and a fourth collection of server computers 102D. The collection of server computers 102A-102D may be collectively referred to as collections of server computers 102. Each of the collections of server computers 102 may include one or more server computers. Only four collections of server computers are shown in FIG. 1 for simplicity, and one skilled in the art will appreciate that there may be a different number of collections of server computers in the network architecture 100. As used herein, the term "couple" may refer to any mechanism configured to enable direct or indirect communication between two or more components. Such components may or may not be in physical contact with one another.

The first collection of server computers 102A may be coupled to a first edge network element 104A. The second collection of server computer 102B may be coupled to a second edge network element 104B. The third collection of server computers 102C may be coupled to a third edge network element 104C. The fourth collection of server computers 102D may be coupled to a fourth edge network element 104D. The edge network elements 104A-104D may be collectively referred to as edge network elements 104. The edge network elements 104 may collectively form an edge layer 106 of the network architecture 100.

The first edge network element 104A and the second edge network element 104B may be coupled to a first aggregation network element 108A. The third edge network element 104C and the fourth edge network element 104D may be coupled to a second aggregation network element 108B. The first aggregation network element 108A and the second aggregation network element 108B may be collectively referred to as aggregation network elements 108. The aggregation network elements 108 may collectively form an aggregation layer 110 of the network architecture 100.

The first aggregation network element 108A may be coupled to a first core network element 112A and a second core network element 112B. The second aggregation network element 108B may also be coupled to the first core network element 112A and the second core network element 112B. The first core network element 112A and the second core network element 112B may be coupled to a network (not shown in FIG. 1). The first core network element 112A and the second core network element 112B may be collectively referred to as core network elements 112. The core network elements 112 may collectively form a core layer 114 of the network architecture.

The core layer 114, the aggregation layer 110, and the edge layer 106 may form a three-layer network architecture, according to some embodiments. In some other embodiments, the edge layer 106 may not be present, and the core layer 114 and the aggregation layer 110 may form a two-layer network architecture. Other multi-layer network architectures may also be contemplated. Further, other implementations of the network architecture 100 may include any number of edge network elements, aggregation network elements, or core elements in various arrangements forming and interconnecting multiple layers.

The core layer 114, the aggregation layer 110, and the edge layer 106 may also be referred to herein as hierarchical network layers of the network architecture 100. The core layer 114 may generally be referred to as a higher layer of the hierarchical network layers, while the aggregation layer 110 and the edge layer 106 may generally be referred to as lower layers of the hierarchical network lawyers.

In some example configurations of a data center, each of the collections of server computers 102 may be arranged in a rack. Multiple racks may be arranged side-by-by side in a row. Multiple rows may be arranged parallel to each other to form an aisle. The edge network elements 104 may be arranged at the top of the racks. Each of the edge network elements 104 may couple server computers arranged in the rack. The aggregation network elements 108 may be arranged at the end of the rows. Each of the aggregation network elements 108 may couple multiple racks in each row. The core network elements 112 may be arranged at the end of the aisles. Each of the core network elements 112 may couple multiple rows in the data center. Other configurations and arrangements of the edge network elements 104, the aggregation network elements 108, and the core network elements 112 may be contemplated.

As illustrated in FIG. 1, some traffic between the collections of server computers 102 may traverse the edge layer 106 and the aggregation layer 110. Some traffic between the collections of server computers 102 may also traverse the core layer 114. In an illustrative example, the first collection of server computers 102A may operate a first virtual machine 116A, and the second collection of server computers 102B may operate a second virtual machine 116B. The third collection of server computers 102C may operate a third virtual machine 116C, and the fourth collection of server computers 102D may operate a fourth virtual machine 116D. The virtual machines 116A-116D may be collectively referred to as virtual machines 116.

In some implementations, the first virtual machine 116A may be adapted to execute a process which generates a data packet that is routed to the second virtual machine 116B. The data packet may be routed from the first collection of server computers 102A to the first edge network element 104A, from the first edge network element 104A to the first aggregation network element 108A, from the first aggregation network element 108A to the second edge network element 104B, and from the second edge network element 104B to the second collection of server computers 102B. In this case, the data packet traverses through the edge layer 106 and the aggregation layer 110, but avoids the core layer 114. As a result, traffic in the core layer 114 is not increased by the transmission of the data packet.

In some other implementations, the first virtual machine 116A may be adapted to execute a process which generates a data packet that is routed to the third virtual machine 116C. The data packet may be routed similarly from the first collection of server computers 102A to the first edge network element 104A and from the first edge network element 104A to the first aggregation network element 108A. However, from the first aggregation network element 108A, the traffic then may be routed to one of the core network elements 112, from one of the core network elements 112 to the second aggregation network element 108B, from the second aggregation network element 108B to the third edge network element 104C, and from the third edge network element 104C to the third collection of server computers 102C. In this case, the data packet traverses through the edge layer 106, the aggregation layer 110, and the core layer 114. As a result, traffic in the core layer 114 is increased by the transmission of the data packet.

In order to reduce traffic in the core layer 114, various embodiments presented herein describe optimization technologies adapted to identify data packets exchanged between the collections of server computers 102. The collections of server computers 102 may operate virtual machines, such as the virtual machines 116, adapted to execute processes which generate the data packets that are transmitted between processes. By analyzing the data packets, the optimization technologies may be adapted to generate virtual machine groups adapted to arrange the virtual machines such that traffic routed through the core layer 114 is reduced and traffic routed through the lower layers, such as the aggregation layer 110 and the core layer 114, stays the same or is increased. The optimization technologies may further be adapted to relocate the virtual machines between the collections of server computers 102 in accordance with the virtual machine groups.

In some embodiments, the optimization technologies may be implemented by one or more optimization modules 118 in the collections of server computers 102. The optimization modules 118 may be arranged and configured in a distributed computing framework adapted to implement the optimization technologies. In this manner, tasks related to optimizing resource utilization can be spread across multiple computing nodes. In some other embodiments, the optimization technologies may be implemented on a centralized optimization system (not shown) coupled to the collections of server computers 102.

In an illustrative example of the optimization technologies, analyzed data packets may indicate that a substantial number of processes executed by the first virtual machine 116A and the third virtual machine 116C may communicate with each other, thereby increasing traffic in the core layer 114. Further, the analyzed data packets may indicate that a substantial number of processes executed by the second virtual machine 116B and the fourth virtual machine 116D may communicate with each other, thereby also increasing traffic in the core layer 114. In this example, the optimization modules 118 may be adapted to generate a first virtual machine group that contains the first virtual machine 116A and the third virtual machine 116C and a second virtual machine group that contains the second virtual machine 116B and the fourth virtual machine 116D.

In accordance with the virtual machine groups, the optimization modules 118 may relocate the third virtual machine 116C from the third collection of server computers 102C to the second collection of server computers 102B and relocate the second virtual machine 116B from the second collection of server computers 102B to the fourth collection of server computers 102D. In this way, the communications between the first virtual machine 116A and the third virtual machine 116C and between the second virtual machine 116B and the fourth virtual machine 116D can be made without routing traffic through the core layer 114. Additional details regarding the operation of the optimization modules 118 are described in greater detail below with reference to FIGS. 2-4.

Figure 2:
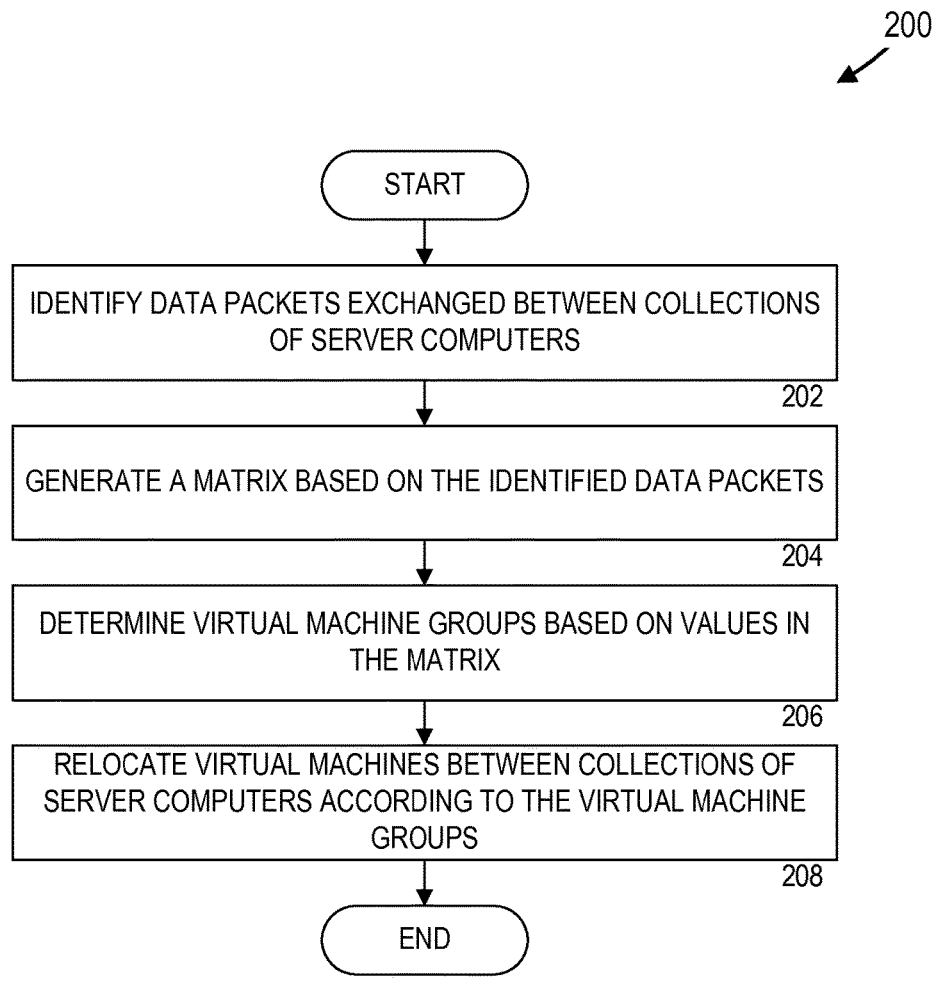
FIG. 2 is a flow diagram illustrating an example process adapted to optimize resource utilization in a collection of devices.

FIG. 2 is a flow diagram illustrating an example process 200 adapted to optimize resource utilization in a collection of devices, arranged in accordance with at least some embodiments presented herein. The process 200 may include various operations, functions, or actions as illustrated by one or more blocks 202-208.

The process 200 may begin at block 202 (Identify Data Packets Exchanged Between Collections of Server Computers), where the optimization modules 118 may be configured identify data packets exchanged between the collections of server computer 102. In some embodiments, the optimization modules 118 may be configured to capture data packets transmitted to or from their respective collections of server computers 102. In some embodiments, the optimization modules 118 may be configured to receive captured data packets from a hardware-based or software-based sniffer. For example, the collections of server computers 102 may include network processors adapted to capture data packets.

Each data packet may include one or more of the following: a source identifier, a destination identifier, and a data packet size. For example, the source identifier, the destination identifier, and the data packet size may be contained in a header of each data packet. The source identifier may specify a source address from which a data packet has been or will be transmitted. The destination process identifier may specify a destination address at which the data packet has been or will be received. The source address and the destination address may be an Internet Protocol ("IP") address, a media access control ("MAC") address, or other suitable network address capable of identifying a source or destination of a data packet. The data packet size may specify a size of the data packet.

The optimization modules 118 may be configured to identify data packets that are transmitted between processes executed by virtual machines operating in the collections of server computers 102. That is, these data packets may be transmitted within a data center. The optimization modules 118 may be configured to identify data packets where the source identifier and the destination identifier specify the virtual machines operating in the collections of server computers 102. The optimization modules 118 may also be configured to disregard data packets where the destination identifier indicates that the data packets are intended to leave the data center. Block 202 may be followed by block 204.

At block 204 (Generate a Matrix Based on the Identified Data Packets), the optimization modules 118 may be configured to generate a matrix based on the identified data packets. The matrix may include multiple rows, multiple columns, and multiple values. Each value may correspond to one of the rows and one of the columns. According to various embodiments, the rows may correspond to an ordered list of virtual machines executed by the collection of server computers 102. Similarly, the columns may also correspond to the same ordered list of virtual machines executed by the collection of server computers.

In some implementations, the virtual machines along each row and each column may represent either a source virtual machine from which data packets are transmitted or a destination virtual machine at which data packets are received. As a result, the matrix may include the same values in an upper diagonal of the matrix as in a lower diagonal of the matrix. The optimization modules 118 may be configured to select one of the upper or lower diagonal portions. The optimization module 118 may be further configured to disregard a diagonal line dividing the upper diagonal and the lower diagonal of the matrix because these values may represent a virtual machine communicating with itself. An example configuration of the matrix is described in greater detail below with reference to FIG. 3.

For each identified data packet having a source identifier, a destination identifier, and a data size, the optimization modules 118 may be configured to match the source identifier to one of the virtual machines in one of the rows (or columns) and to match the destination identifier to another one of the virtual machines in one of the columns (or rows). The matched row and the matched column may correspond to one of the values. Upon identifying the value corresponding to the matched row and the matched column, the optimization modules 118 may be configured to increase the value by adding the data size of the identified data packet to the value. By increasing the value by the data size of the identified packet, the matrix can maintain a record of the amount of traffic transmitted between pairs of virtual machines operating in the collections of server computers 102.

In some embodiments, the optimization modules 118 may be configured to initialize the values of the matrix to a zero value or some other initial value prior to increasing the values. The optimization modules 118 may also be configured to periodically reset the values back to the initial value. For example, processes executed by the virtual machines may start and stop within an estimated time frame. Here, the optimization modules 118 may be configured to periodically reset the values according to the estimated time frame so that values corresponding to processes that are likely no longer being executed can be disregarded. Resets may also be triggered by events such as virtual machine launches or terminations, or other changes of state or environment. Block 204 may be followed by block 206.

At block 206 (Determine Virtual Machine Groups Based on Values in the Matrix), the optimization modules 118 may be configured to determine virtual machine groups based on values in the selected diagonal of the matrix. Each virtual machine group may contain two or more virtual machines. The optimization modules 118 may be configured to determine the virtual machine groups such that traffic in the lower levels of the network architecture 100 is maximized and traffic in the core layer 114 of the network architecture 100 is minimized.

According to various embodiments, the optimization modules 118 may be configured to determine the virtual machine groups by solving a graph problem. The graph problem may be conceptually described as follows. Multiple core-level buckets may be presented. Each core-level bucket may represent a core network element and the collections of server computers coupled to the core network element. The core network element may be coupled to multiple aggregation network elements, multiple edge network elements, and multiple collections of server computers. As a result, the core-level buckets may be the largest buckets, thereby representing the greatest amount of computing power compared to other buckets.

Each core-level bucket may include multiple aggregation-level buckets. Each aggregation-level bucket may represent an aggregation network element and the collections of server computers coupled to the aggregation network. The aggregation network element may be coupled to multiple edge network elements and multiple collections of server computers. As a result, the aggregation-level buckets may be the edge-level buckets may be smaller than their respective aggregation-level buckets, thereby representing a lesser amount of computing power.

Each aggregation-level bucket may include multiple edge-level buckets. Each edge-level bucket may represent an edge network element and the collection of server computers coupled to the edge network element. Thus, the edge-level buckets may be smaller than their respective aggregation-level buckets, thereby representing a lesser amount of computing power.

The optimization modules 118 may be configured to place virtual machines in each edge-level bucket. Each edge-level bucket, and thus each aggregation-level bucket and each core-level bucket, may be adapted to hold only a threshold number of virtual machines corresponding to the amount of computing power of the collection of server computers associated with the edge-level bucket. The virtual machines placed in a given edge-level bucket may form a virtual machine group.

The graph problem may be solved by maximizing traffic in the edge layer 106 while also minimizing added traffic in the aggregation layer 110 and the core layer 114. Example solutions may observe possible limitations based on power, computing capability, or other placement constraints and metrics. The traffic between a pair of virtual machines may be defined by an intersecting value specifying an amount of data traffic communicated between the two virtual machines.

Such intersecting value may be defined by a matrix, such as a matrix 300 described in greater detail below with reference to FIG. 3.

In some example implementations, the optimization modules 118 may be configured to place pairs of virtual machines into one or more edge-level buckets. As the optimization modules 118 place the pairs of virtual machines into the edge-level buckets, the optimization modules 118 may be configured to compute an edge-level score for each edge-level bucket. The edge-level score of a given edge-level bucket may be computed by summing the intersecting values for each pair of virtual machines contained in the edge-level bucket.

The optimization modules 118 may be configured to maximize the edge-level score of each edge-level bucket. In this way, the optimization modules 118 can maximize traffic in the edge layer 106. The optimization modules 118 may also be configured to minimize traffic within the aggregation layer 110 and the core layer 114. Additional details regarding the operation of the optimization modules 118 with respect to minimizing the traffic within the aggregation-level buckets and the core-level buckets are provided below with reference to FIG. 4.

The optimization modules 118 may be configured to solve the graph problem via linear programming, greedy algorithms, dynamic programming, and other techniques capable of solving complex graph problems. In some embodiments, the optimization modules 118 may be configured to utilize MAP-REDUCE and HADOOP technologies in order to solve the graph problem via a distributed computing framework. Block 206 may be followed by block 208.

At block 208 (Relocate Virtual Machines between the Collections of Server Computers According to the Virtual Machine Groups), the optimization modules 118 may be configured to relocate the virtual machines between the collections of server computers 102 according to the determined virtual machine groups. For example, virtual machines placed in a given edge-level bucket may be arranged such that the virtual machines are co-located in collections of server computers 102 separated by no greater than an edge network element.

In some embodiments, the optimization modules 118 may be configured to perform a lazy relocation. In lazy relocation, the optimization modules 118 may be configured to relocate a virtual machine when a process executed by the virtual machine sleeps. In this manner, the virtual machine can be relocated without causing disruption to the execution of the process. In some other embodiments, the optimization modules 118 may be configured to perform an aggressive relocation. In aggressive relocation, the optimization modules 118 may be configured to relocate a virtual machine even when a process is being executed. The optimization modules 118 may be configured to pause the execution of the process, relocate the virtual machine, and resume execution of the process. The choice between lazy and other types of relocation may depend on the level of congestion of the core layer or other indicators of urgency, according to various embodiments. After block 208, the process 200 either repeats (e.g., periodically, continuously, or on demand as needed) or terminate.

FIG. 3 is a diagram illustrating an example implementation of a portion of matrix 300, arranged in accordance with at least some embodiments presented herein. The matrix 300 may include multiple rows 302A-302E and multiple columns 304A-304E. The matrix 300 may further include multiple values, such as the values 306A-306Y. Each of the values 306A-306Y may correspond to one of the rows 302A-302E and one of the columns 304A-304E. The rows 302A-302E may correspond to an ordered list of virtual machines labelled virtual machine A through virtual machine E. The columns 304A-304E may correspond to the same ordered list of virtual machines labelled virtual machine A through virtual machine E.

For each identified data packet having a source identifier, a destination identifier, and a data packet size, the optimization modules 118 may be configured to identify one of the rows 302A-302E that matches the source identifier and one of the columns 304A-304E that matches the destination identifier. For example, the matched row may be row 302B and matched column may be column 304D. The matched row 302B and the matched column 304D may correspond to a value 306Q. The optimization modules 118 may be configured to add the data packet size to the value 306Q.

Further, the optimization modules 118 may be configured to identify one of the columns 304A-304E that matches the source identifier and one of the rows 302A-302E that matches the source identifier. Following the previous example, the matched column may be 304B and the matched row may be 302D. The matched column 304B and the matched row 302D may correspond to a value 306I. The optimization modules 118 may be configured to add the data packet size to the value 306I.

As illustrated in FIG. 3, the value 306I and the value 306Q may be redundant (represented at 123). In particular, the matrix 300 may be divided in a lower diagonal and an upper diagonal. The lower diagonal, which identified by vertical hatching in FIG. 3, may include the values 306B-306E, 306H-306J, 306N-306O, and 306T. The upper diagonal, which is identified by horizontal hatching in FIG. 3, may include the values 306F, 306K-306L, 306P-306R, and 306U-306X. Because the lower diagonal and the upper diagonal may include the redundant values, the optimization modules 118 may be configured to disregard either the lower diagonal or the upper diagonal when the optimization modules 118 analyze the matrix 300 to generate the virtual machine groups. The optimization modules 118 may also be configured to disregard the values 306A, 306G, 306M, 306S, and 306Y along a diagonal line of the matrix because these values may represent a virtual machine communicating with itself.

Figure 4:
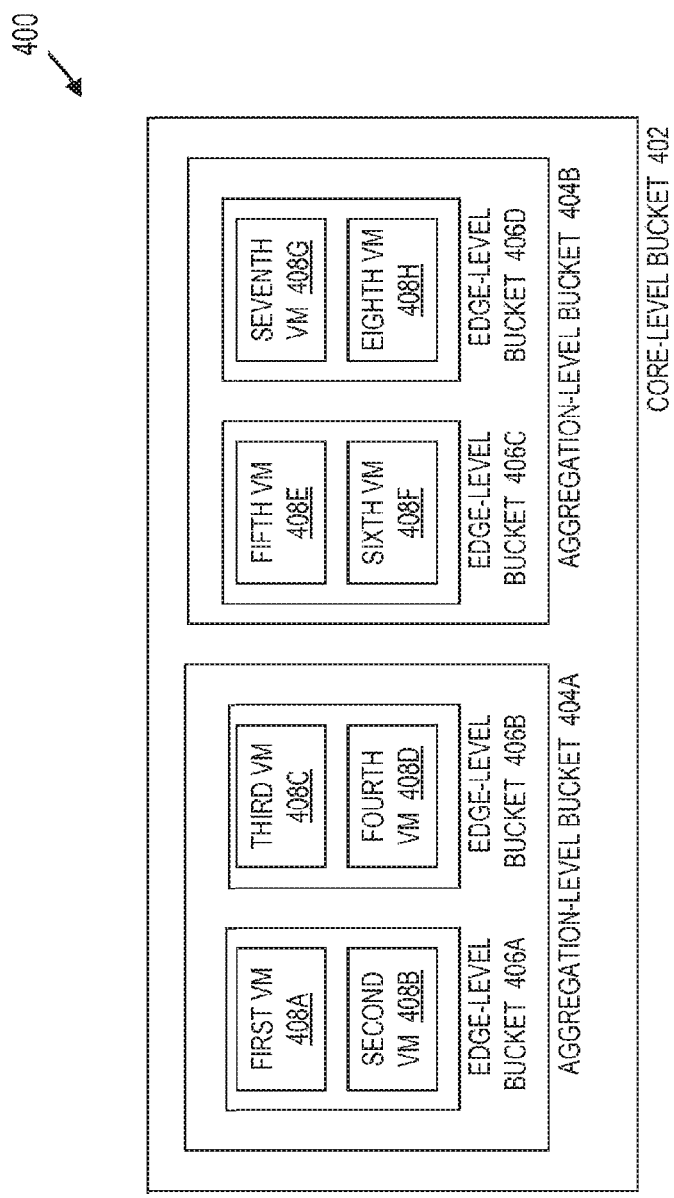
FIG. 4 is a diagram illustrating an example conceptualized representation of a graph problem.
Figure 5:
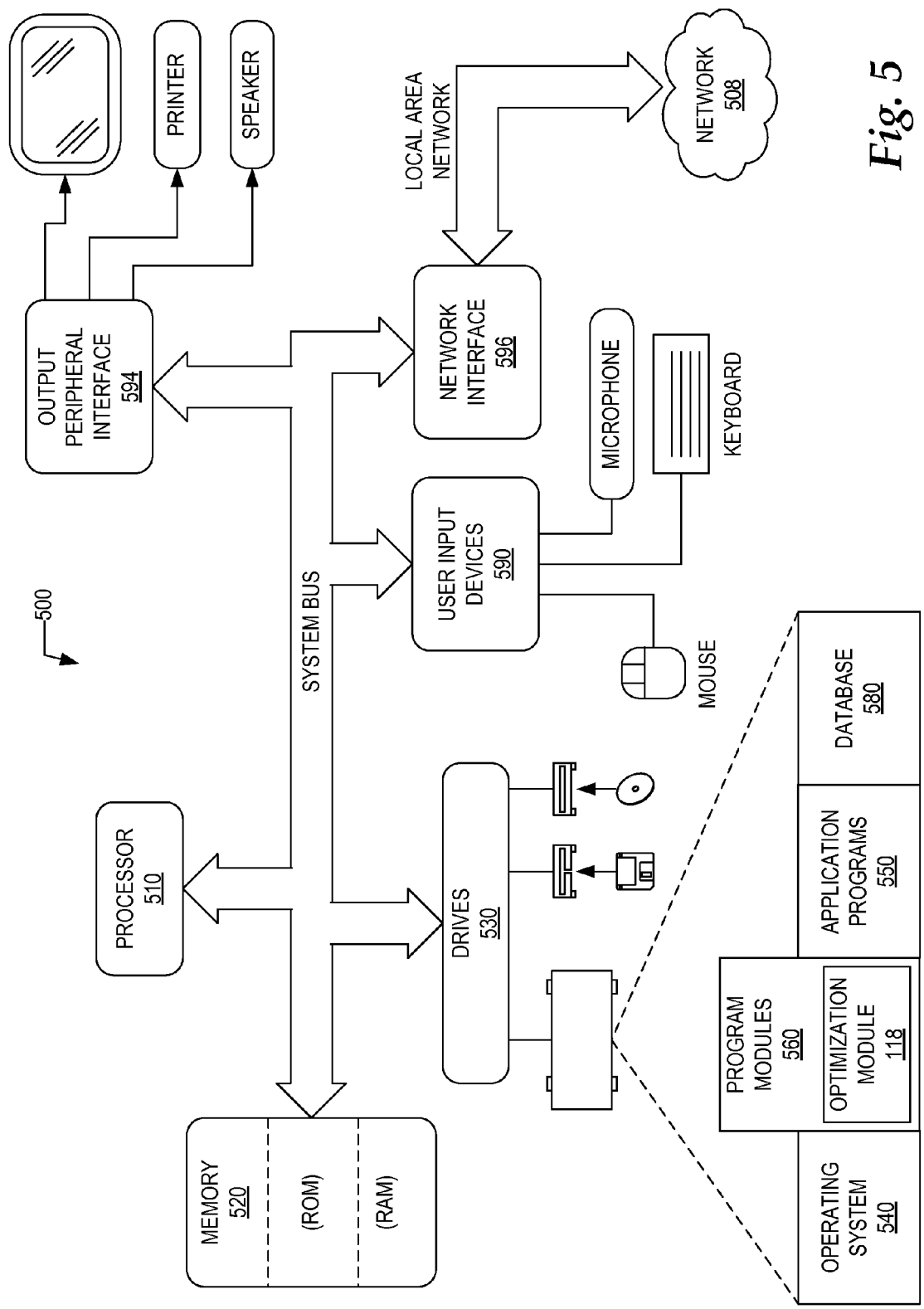
FIG. 5 is a block diagram illustrating a computer hardware architecture for an example computing system.

FIG. 4 is a diagram illustrating an example conceptualized representation 400 of a graph problem, arranged in accordance with at least some embodiments presented herein. The conceptualized representation 400 may correspond to the network architecture 100 of FIG. 1. The conceptualized representation 400 may include a core-level bucket 402. The core-level bucket 402 may include a first aggregation-level bucket 404A and the second aggregation-level bucket 404B. The aggregation-level buckets 404A-404B may be collectively referred to as aggregation-level buckets 404.

The first aggregation-level bucket 404A may correspond to the first aggregation network element 108A, and the second aggregation-level bucket 404B may correspond to the second aggregation network element 108B. The first aggregation-level bucket 404A may include a first edge-level bucket 406A and a second edge-level bucket 406B. The first edge-level bucket 406A may correspond to the first edge network element 104A, and the second edge-level bucket 406B may correspond to the second edge network element 104B. The second aggregation-level bucket 404B may include a third edge-level bucket 406C and a fourth edge-level bucket 406D. The third edge-level bucket 406C may correspond to the third edge network element 104C, and the fourth edge-level bucket 406D may correspond to the fourth edge network element 104D. The edge-level buckets 406A-406A may be collectively referred to as edge-level buckets 406.

In an illustrative example, the optimization modules 118 may place a first virtual machine 408A and a second virtual machine 408B in the first edge-level bucket 406A. Due to space considerations, each virtual machine is labelled as "VM" in FIG. 3. The optimization modules 118 may place a third virtual machine 408C and a fourth virtual machine 408D in the second edge-level bucket 406B. The optimization modules 118 may place a fifth virtual machine 408E and a sixth virtual machine 408F in the third edge-level bucket 406C. The optimization modules 118 may place a seventh virtual machine 408G and an eighth virtual machine 408H in the fourth edge-level bucket 406D. The virtual machines 408A-408H may be collectively referred to as virtual machines 408.

As previously described with reference to FIG. 2, the optimization modules 118 may be configured to maximize traffic in the edge layer 106. In order to maximize traffic in the edge layer 106, the optimization modules 118 may be configured to maximize the edge-level score of each of the edge-level buckets 406. For example, the edge-level score of the first edge-level bucket 406A may be an intersecting value specifying an amount of data traffic between the first virtual machine 408A and the second virtual machine 408B. If additional pairs of virtual machines are placed in the first edge-level bucket 406A, the edge-level score of the first edge-level bucket 406A may be increased by the intersecting values of the additional pairs of virtual machines. The optimization modules 118 may be configured to retrieve the intersecting values from the matrix 300, according to some embodiments.

As previously described with reference to FIG. 2, the optimization modules 118 may also be configured to minimize added traffic in the aggregation layer 110 and the core layer 114. In order to minimize traffic in the aggregation layer 110, the optimization modules 118 may be configured to minimize an aggregation-level score of each of the aggregation-level buckets 404. For example, the aggregation-level score of the first aggregation-level bucket 404A may be a sum of intersecting values between pairs of virtual machines where one virtual machine (e.g., the first virtual machine (e.g., the first virtual machine 408A) is selected from the first edge-level bucket 406A and another virtual machine (e.g., the third virtual machine 408C) is selected from the second edge-level bucket 406B.

In order to minimize traffic in the core layer 114, the optimization modules 118 may be configured to minimize a core-level score of the core-level bucket 402. For example, the core-level score of the core-level bucket 402 may be a sum of intersecting values between pairs of virtual machines where one virtual machine (e.g., the second virtual machine 408B) is selected from the first aggregation-level bucket 404A and another virtual machine (e.g., the eighth virtual machine 408H) is selected from the second aggregation-level bucket 404B. The optimization modules 118 may be configured to maximize the edge-level scores of the edge-level buckets 406 in such a way that the aggregation-level scores of the aggregation-level buckets 404 and the core-level score of the core-level bucket 402 are minimized. In this manner, the optimization modules 118 can maximize traffic in the edge layer 106, while also minimizing added traffic in the aggregation layer 110 and the core layer 114.

As illustrated in FIG. 3, the value 302I and the value 302Q may be redundant. In particular, the matrix 300 may be divided in a lower diagonal and an upper diagonal. The lower diagonal, which identified by vertical hatching in FIG. 3, may include the values 306B-306E, 306H-306J, 306N-306O, and 306T. The upper diagonal, which is identified by horizontal hatching in FIG. 3, may include the values 306F, 306K-306L, 306P-306R, and 306U-306X. Because the lower diagonal and the upper diagonal may include the redundant values, the optimization modules 118 may be configured to disregard either the lower diagonal or the upper diagonal when the optimization modules 118 analyze the matrix 300 to generate the virtual machine groups. The optimization modules 118 may also be configured to disregard the values 306A, 306G, 306M, 306S, and 306Y along a diagonal line of the matrix because these values may represent a virtual machine communicating with itself.

The drives 530 and their associated computer storage media, provide storage of computer readable instructions, data structures, program modules and other data for the computer 500. The drives 530 can include an operating system 540, application programs 550, program modules 560, and a database 580. The computer 500 further includes user input devices 590 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

The first aggregation-level bucket 404A may correspond to the first aggregation network element 108A, and the second aggregation-level bucket 404B may correspond to the second aggregation network element 108B. The first aggregation-level bucket 404A may include a first edge-level bucket 406A and a second edge-level bucket 406B. The first edge-level bucket 406A may correspond to the first edge network element 104A, and the second edge-level bucket 406B may correspond to the second edge network element 104B. The second aggregation-level bucket 404B may include a third edge-level bucket 406C and a fourth edge-level bucket 406D. The third edge-level bucket 406C may correspond to the third edge network element 104C, and the fourth edge-level bucket 406D may correspond to the fourth edge network element 104D. The edge-level buckets 406A-406D may be collectively referred to as edge-level buckets 406.

The computer 500 may operate in a networked environment using logical connections to one or more computers, such as a remote computer coupled to a network interface 596. The remote computer may be a personal computer, a server, a router, a network PC, a peer device or other common network node, and can include many or all of the elements described above relative to the computer 500. Networking environments are commonplace in offices, enterprise-wide area networks ("WAN"), local area networks ("LAN"), intranets, and the Internet.

As previously described with reference to FIG. 2, the optimization modules 118 may also be configured to minimize added traffic in the aggregation layer 110 and the core layer 114. In order to minimize traffic in the aggregation layer 110, the optimization modules 118 may be configured to minimize an aggregation-level score of each of the aggregation-level buckets 404. For example, the aggregation-level score of the first aggregation-level bucket 404A may be a sum of intersecting values between pairs of virtual machines where one virtual machine (e.g., the first virtual machine 408A) is selected from the first edge-level bucket 406A and another virtual machine (e.g., the third virtual machine 408C) is selected from the second edge-level bucket 406B.

According to some embodiments, the computer 500 may be coupled to a networking environment. The computer 500 may include one or more instances of a physical computer-readable storage medium or media associated with the drives 530 or other storage devices. The system bus may enable the processor 510 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 520, whether characterized as RAM, ROM, flash, or other types of volatile or nonvolatile memory technology. The media may also represent secondary storage, whether implemented as the storage drives 530 or otherwise. Hard drive implementations may be characterized as solid state, or may include rotating media storing magnetically-encoded information.

The storage media may include one or more program modules 560. The program modules 560 may include software instructions that, when loaded into the processor 510 and executed, transform a general-purpose computing system into a special-purpose computing system. As detailed throughout this description, the program modules 560 may provide various tools or techniques by which the computer 500 may participate within the overall systems or operating environments using the components, logic flows, and/or data structures discussed herein.

The processor 510 may be constructed from any number of transistors or other circuit elements, which may individually or collectively assume any number of states. More specifically, the processor 510 may operate as a state machine or finite-state machine. Such a machine may be transformed to a second machine, or specific machine by loading executable instructions contained within the program modules 560. These computer-executable instructions may transform the processor 510 by specifying how the processor 510 transitions between states, thereby transforming the transistors or other circuit elements constituting the processor 510 from a first machine to a second machine. The states of either machine may also be transformed by receiving input from the one or more user input devices 590, the network interface 596, other peripherals, other interfaces, or one or more users or other actors. Either machine may also transform states, or various physical characteristics of various output devices such as printers, speakers, video displays, or otherwise.

Encoding the program modules 560 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 560 may transform the physical state of the semiconductor memory 520 when the software is encoded therein. For example, the software may transform the state of transistors, capacitors, or other discrete circuit elements constituting the semiconductor memory 520.

As another example, the storage media may be implemented using magnetic or optical technology such as drives 530. In such implementations, the program modules 560 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Figure 6:
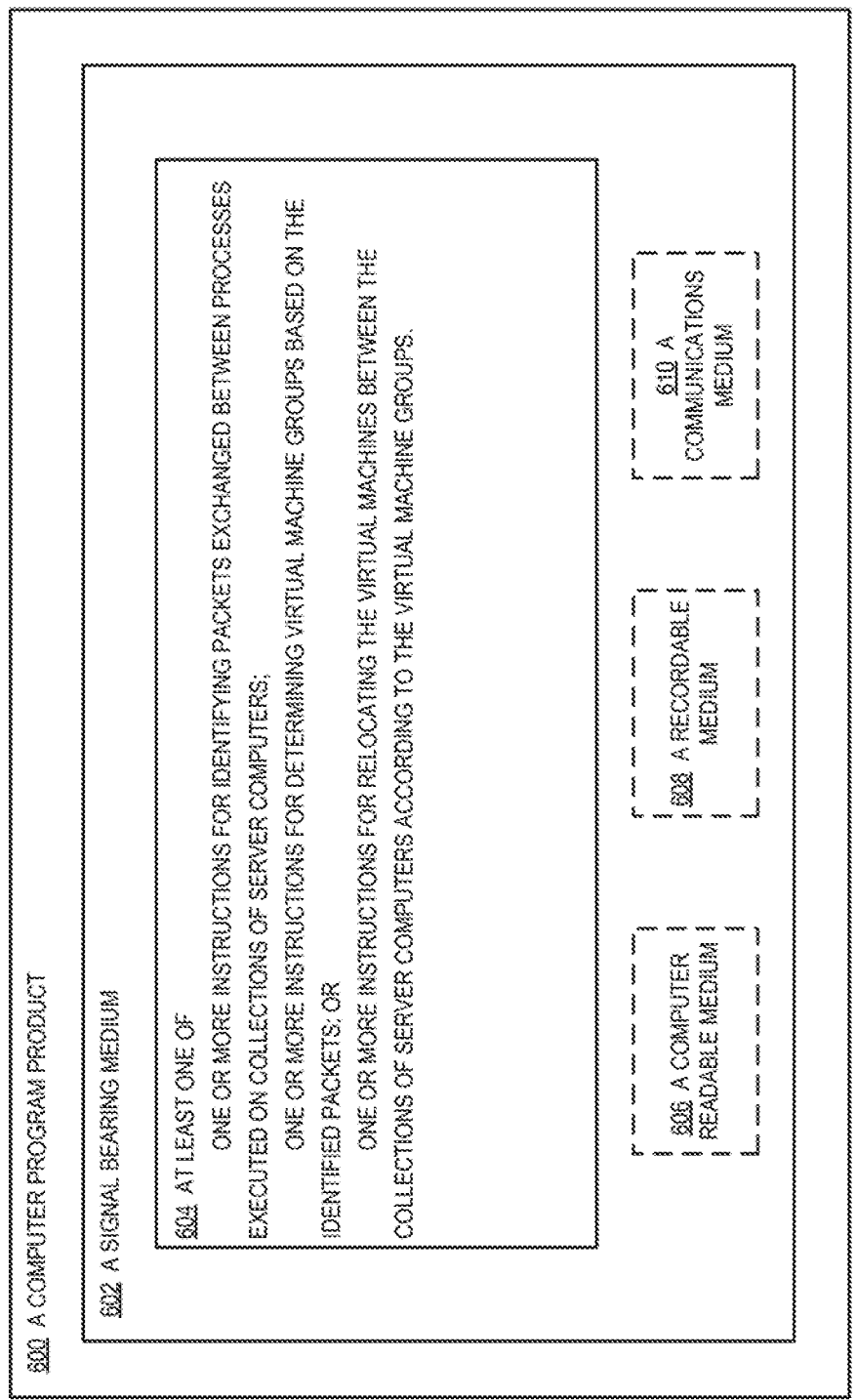
FIG. 6 is a schematic diagram illustrating a computer program product that includes a computer program for executing a computer process on a computing device, all arranged in accordance with at least some embodiments presented herein.

FIG. 6 is a schematic diagram that illustrates a computer program product 600 that includes a computer program for executing a computer process on a computing device, arranged in accordance with at least some embodiments presented herein. An illustrative embodiment of the example computer program product is provided using a signal bearing medium 602, and may include at least one instruction of 604: one or more instructions for identifying packets exchanged between a processes executed on collections of server computers; one or more instructions for determining virtual machine groups based on the identified packets; or one or more instructions for relocating the virtual machines between the collections of server computers according to the virtual machine groups. In some embodiments, the signal bearing medium 602 of the one or more computer program products 600 include a computer readable medium 606, a recordable medium 608, and/or a communications medium 610.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-core processor systems, microprocessor-based or programmable consumer electronics, minicomputers, mainframe computers, and the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the Detailed Description, claims, or Figures, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to manage data traffic in a data center that includes servers configured in communication over a hierarchical network with a plurality of layers, the method comprising:
    monitoring a first packet transfer of first packets over the hierarchical network between a first virtual machine under execution by a first server and a second virtual machine under execution by a second server, wherein individual ones of the first packets include a first identifier that corresponds to the first virtual machine and a second identifier that corresponds to the second virtual machine;
    based, at least in part, on the monitoring the first packet transfer, determining that the first packet transfer utilizes a higher layer of the hierarchical network; and
    relocating the first virtual machine to a third server such that a second packet transfer of second packets over the hierarchical network between the first virtual machine under execution by the third server and the second virtual machine under execution by the second server utilizes a layer of the hierarchical network other than the higher layer of the hierarchical network, wherein the relocating the first virtual machine is based on at least a level of data traffic at the higher layer, and wherein the level of data traffic at the higher layer indicates whether the relocating the first virtual machine occurs:
        during execution of one or more processes such that the execution of the one or more processes is configured to pause for the relocating, or
        while the first virtual machine sleeps such that disruption to the execution of the one or more processes is reduced.

2. The method of claim 1, wherein the determining that the first packet transfer utilizes the higher layer of the hierarchical network includes determining that the first packet transfer utilizes a core layer.

3. The method of claim 1, wherein the second packet transfer utilizes one or more of an edge layer or an aggregation layer of the hierarchical network.

4. The method of claim 1, further comprising:
    calculating a total data size of the first packet transfer, based on a first data size of each of the first packets; and
    determining that the total data size exceeds a data size threshold.

5. The method of claim 1, wherein the relocating the first virtual machine to the third server includes relocating the first virtual machine to a server that is in a same rack of the data center as the second server.

6. The method of claim 1, wherein the third server and the second server are coupled to a network element of an edge layer of the hierarchical network.

7. The method of claim 1, wherein the third server and the second server are coupled to a network element of an aggregation layer of the hierarchical network.

8. A system, comprising:
a data center that includes servers configured in communication over a hierarchical network with a plurality of layers, wherein at least one of the servers is configured with a module operative to perform actions that cause one or more of the servers to:
monitor a first packet transfer of a first plurality of packets over the hierarchical network between a first virtual machine under execution by a first server and a second virtual machine under execution by a second server, wherein individual ones of the first plurality of packets comprises a first identifier that corresponds to the first virtual machine and a second identifier that corresponds to the second virtual machine;
based, at least in part, on the monitored first packet transfer of the first plurality of packets, determine that the first packet transfer utilizes a higher layer of the hierarchical network; and
in response to the determination, relocate the first virtual machine to the second server, wherein the relocation of the first virtual machine is based on at least a level of data traffic at the higher layer, the level of data traffic at the higher layer being indicative of whether the relocation of the first virtual machine occurs:
during execution of one or more processes such that the execution of the one or more processes is configured to pause for the relocation, or
while the first virtual machine sleeps such that disruption to the execution of the one or more processes is reduced.

9. The system of claim 8, wherein the higher layer of the hierarchical network includes a core layer.

10. The system of claim 8, wherein after the relocation of the first virtual machine to the second server, a second packet transfer utilizes one or more of an edge layer or an aggregation layer of the hierarchical network, rather than the higher layer of the hierarchical network.

11. The system of claim 8, wherein the module is further configured to calculate a total data size of the first packet transfer and determine that the total data size exceeds a data size threshold.

12. The system of claim 8, wherein the second server is in a different rack of the data center than the first server.

13. A non-transitory computer-readable medium having stored thereon computer-executable instructions that, in response to execution by at least one server of a plurality of servers of a data center, cause the at least one server to perform operations comprising:
monitor a first packet transfer of first packets over a hierarchical network between a first virtual machine under execution by a first server and a second virtual machine under execution by a second server, wherein individual ones of the first packets include a first identifier that corresponds to the first virtual machine and a second identifier that corresponds to the second virtual machine;
determine, based at least in part on the monitored first packet transfer, that the first packet transfer utilizes a higher layer of the hierarchical network; and
relocate the first virtual machine to a third server such that a second packet transfer of second packets over the hierarchical network between the first virtual machine under execution by the third server and the second virtual machine under execution by the second server utilizes a layer of the hierarchical network other than the higher layer of the hierarchical network, wherein the relocation of the first virtual machine is based on at least a level of data traffic at the higher layer, the level of data traffic at the higher layer being indicative of whether the relocation of the first virtual machine occurs:
during execution of one or more processes such that the execution of the one or more processes is configured to pause for the relocation, or
while the first virtual machine sleeps such that disruption to the execution of the one or more processes is reduced.

14. The non-transitory computer-readable medium of claim 13, wherein the higher layer of the hierarchical network includes a core layer.

15. The non-transitory computer-readable medium of claim 13, wherein the second packet transfer utilizes one or more of an edge layer or an aggregation layer of the hierarchical network.

16. The non-transitory computer-readable medium of claim 13, wherein the operations further comprise:
calculate a total data size of the first packet transfer, based on a first data size of each of the first packets; and
determine that the total data size exceeds a data size threshold.

17. The non-transitory computer-readable medium of claim 13, wherein the third server is in a same rack of the data center as the second server.

18. The non-transitory computer-readable medium of claim 13, wherein the third server and the second server are coupled to a network element of an edge layer of the hierarchical network.

19. The non-transitory computer-readable medium of claim 13, wherein the third server and the second server are coupled to a network element of an aggregation layer of the hierarchal network.

* * * * *